United States Patent
Reichenbach et al.

(10) Patent No.: US 12,490,065 B2
(45) Date of Patent: Dec. 2, 2025

(54) REWARDS FOR CUSTOM DATA TRANSMISSIONS

(71) Applicant: Hewlett Packard Enterprise Development LP, Houston, TX (US)

(72) Inventors: Christian Reichenbach, Hamburg (DE); Ralph Beckmann, Boeblingen (DE); Bernd Kammholz, Boeblingen (DE); Katarina Saric, Boeblingen (DE)

(73) Assignee: Hewlett Packard Enterprise Development LP, Spring, TX (US)

( * ) Notice: Subject to any disclaimer, the term of this patent is extended or adjusted under 35 U.S.C. 154(b) by 1247 days.

(21) Appl. No.: 16/448,513

(22) Filed: Jun. 21, 2019

(65) Prior Publication Data

US 2020/0090208 A1    Mar. 19, 2020

Related U.S. Application Data

(63) Continuation of application No. 16/131,578, filed on Sep. 14, 2018, now Pat. No. 11,864,072.

(51) Int. Cl.
*H04W 4/38*    (2018.01)
*B60R 16/023*    (2006.01)
(Continued)

(52) U.S. Cl.
CPC ............. *H04W 4/38* (2018.02); *B60R 16/023* (2013.01); *B60R 16/0231* (2013.01);
(Continued)

(58) Field of Classification Search
None
See application file for complete search history.

(56) References Cited

U.S. PATENT DOCUMENTS 9,672,569 B2    6/2017  Fernandes et al.
10,042,359 B1 *  8/2018  Konrardy ............. G05D 1/0061
(Continued)

FOREIGN PATENT DOCUMENTS

CN    108550224 A  *  9/2018  ......... G06Q 30/0207
JP    2019007954 A  *  1/2019  ............. G01C 21/34
(Continued)

OTHER PUBLICATIONS

Blockchain/Distributed Ledger Working Group. "Using Blockchain Technology to Secure the Internet of Things." (Nov. 15, 2002). Retrieved online Apr. 14, 2022. https://downloads.cloudsecurityalliance.org/assets/research/blockchain/Using_BlockChain_Technology_to_Secure_the_Internet_of_Things.pdf (Year: 2002).*
(Continued)

*Primary Examiner* — James A Reagan
(74) *Attorney, Agent, or Firm* — Sheppard Mullin Richter & Hampton LLP

(57) ABSTRACT

An example system comprising a computing device to transmit data from a vehicle provisioned with a plurality of hardware computing resources to a decentralized entity, the computing device to receive a custom data selection from the vehicle in response to a conditional request for a particular data set by the decentralized entity, apply a hash function to the custom data selection, transmit the custom data selection to the decentralized entity, verify that the custom data selection fulfills the conditional request of the decentralized entity, and transmit a reward to the vehicle from the decentralized entity in response to the custom data selection having fulfilled the conditional request.

20 Claims, 6 Drawing Sheets

(51) Int. Cl.

| | | |
|---|---|---|
| *B60R 16/037* | (2006.01) | |
| *G06Q 30/0207* | (2023.01) | |
| *G06Q 30/0211* | (2023.01) | |
| *G06Q 30/0217* | (2023.01) | |
| *G06Q 40/08* | (2012.01) | |
| *H04L 9/06* | (2006.01) | |
| *H04L 9/32* | (2006.01) | |
| *H04W 4/44* | (2018.01) | |

(52) U.S. Cl.
CPC ........ *B60R 16/0234* (2013.01); *B60R 16/037* (2013.01); *G06Q 30/0211* (2013.01); *G06Q 30/0217* (2013.01); *G06Q 30/0236* (2013.01); *G06Q 40/08* (2013.01); *H04L 9/0643* (2013.01); *H04W 4/44* (2018.02); *H04L 9/3236* (2013.01)

(56) References Cited

U.S. PATENT DOCUMENTS

| | | | |
|---|---|---|---|
| 10,049,505 B1* | 8/2018 | Harvey | G07C 5/0841 |
| 10,252,145 B2* | 4/2019 | Tran | G06F 3/00 |
| 10,320,843 B1* | 6/2019 | Dobrek | H04L 63/18 |
| 10,476,847 B1* | 11/2019 | Smith | H04L 63/0407 |
| 10,686,611 B2* | 6/2020 | Ramos | H04L 9/0637 |
| 10,715,326 B2* | 7/2020 | Maim | G06Q 20/065 |
| 10,753,754 B2* | 8/2020 | DeLizio | G05D 1/0291 |
| 10,819,684 B2* | 10/2020 | Ramos | G06F 21/6245 |
| 10,853,812 B2* | 12/2020 | Kuchar | G06F 16/9024 |
| 10,861,039 B2* | 12/2020 | Leonard | G06Q 30/08 |
| 11,057,353 B2* | 7/2021 | Smith | H04L 9/3239 |
| 11,168,994 B2* | 11/2021 | DeLizio | G01C 21/3438 |
| 11,184,394 B1* | 11/2021 | Dobrek | H04L 9/3239 |
| 11,223,631 B2 | 1/2022 | Sharma et al. | |
| 11,320,276 B2* | 5/2022 | Muta | G01C 21/3438 |
| 11,363,426 B1 | 6/2022 | Sanchez | |
| 11,403,710 B1 | 8/2022 | Davidson et al. | |
| 2005/0177624 A1* | 8/2005 | Oswald | H04L 67/104 709/219 |
| 2005/0177853 A1* | 8/2005 | Williams | H04N 21/2181 725/111 |
| 2010/0070343 A1 | 3/2010 | Taira et al. | |
| 2013/0332286 A1 | 12/2013 | Medelius et al. | |
| 2014/0087760 A1* | 3/2014 | Bennett | H04W 4/40 455/456.3 |
| 2014/0309885 A1* | 10/2014 | Ricci | G06F 3/0482 701/41 |
| 2015/0348335 A1* | 12/2015 | Ramanujam | G06Q 10/00 701/23 |
| 2016/0123754 A1* | 5/2016 | Li | B60K 35/00 701/123 |
| 2017/0197617 A1* | 7/2017 | Penilla | G08G 1/0112 |
| 2018/0001184 A1* | 1/2018 | Tran | A63B 71/145 |
| 2018/0041345 A1* | 2/2018 | Maim | G06F 21/31 |
| 2018/0202822 A1* | 7/2018 | DeLizio | G01C 21/362 |
| 2018/0300741 A1* | 10/2018 | Leonard | G06Q 30/08 |
| 2018/0342036 A1* | 11/2018 | Zachary | H04L 9/0637 |
| 2019/0102850 A1 | 4/2019 | Wheeler et al. | |
| 2019/0158606 A1* | 5/2019 | Guim Bernat | G06F 9/4856 |
| 2019/0165949 A1* | 5/2019 | Ramos | H04L 9/3239 |
| 2019/0166101 A1* | 5/2019 | Ramos | H04L 9/3239 |
| 2019/0220583 A1 | 7/2019 | Douglas et al. | |
| 2019/0279215 A1* | 9/2019 | Kuchar | G06Q 20/065 |
| 2019/0312855 A1* | 10/2019 | Sharma | H04L 67/18 |
| 2019/0318262 A1 | 10/2019 | Meinders | |
| 2019/0342143 A1 | 11/2019 | Lin | |
| 2019/0349733 A1 | 11/2019 | Nolan et al. | |
| 2019/0361917 A1 | 11/2019 | Tran et al. | |
| 2019/0370760 A1 | 12/2019 | Kundu et al. | |
| 2020/0051011 A1 | 2/2020 | Dasari et al. | |
| 2020/0057487 A1 | 2/2020 | Sicconi et al. | |
| 2020/0112545 A1* | 4/2020 | Smith | H04L 63/0407 |
| 2020/0134592 A1 | 4/2020 | Rao et al. | |
| 2020/0225655 A1 | 7/2020 | Cella et al. | |
| 2020/0294128 A1 | 9/2020 | Cella | |
| 2020/0364588 A1 | 11/2020 | Knox | |
| 2020/0374118 A1* | 11/2020 | Maim | G06F 21/6254 |
| 2020/0386558 A1* | 12/2020 | DeLizio | G01C 21/3407 |
| 2021/0087760 A1* | 3/2021 | Maus | E01F 9/529 |
| 2021/0097408 A1 | 4/2021 | Sicconi et al. | |
| 2021/0133670 A1 | 5/2021 | Cella et al. | |
| 2021/0192526 A1* | 6/2021 | Kuchar | G06Q 20/0655 |
| 2021/0312558 A1* | 10/2021 | Floyd | H04L 63/1408 |
| 2021/0377225 A1* | 12/2021 | Smith | H04L 63/0407 |
| 2022/0065636 A1* | 3/2022 | DeLizio | G05D 1/0276 |
| 2022/0094696 A1* | 3/2022 | Sharma | H04L 63/0485 |

FOREIGN PATENT DOCUMENTS

| | | | |
|---|---|---|---|
| WO | WO-2018020377 A1 * | 2/2018 | ........ G06Q 20/0855 |
| WO | 2018/131004 A3 | 10/2018 | |
| WO | 2021/046552 A1 | 3/2021 | |

OTHER PUBLICATIONS

Geoffrey Cann. "What cars on blockchain will do to fuel retailing." (Mar. 19, 2018). Retrieved online Apr. 14, 2022. https://geoffreycann.com/what-cars-on-blockchain-will-do-to-fuel-retailing/ (Year: 2018).*

Wei Yu. "A Survey on the Edge Computing for the Internet of Things." (Nov. 29, 2017). Retrieved online Apr. 24, 2023. https://ieeexplore.ieee.org/stamp/stamp.jsp?arnumber=8123913 (Year: 2017).*

Data marketplace powered by Blockchain and the global network of sensors, (Research Paper), Retrieved Jun. 26, 2018, 7 Pgs., https://datapace.io/.

Databroker DAO : Decentralized Marketplace for Sensor Data, (Research Paper), Retrieved Aug. 15, 2018, 8 Pgs., Https://steemit.com/cryptocurrency/@henrysparks/databroker-dao-decentralized-marketplace-for-sensor-data.

How The Blockchain Could Usher In A Future Of Shared Mobility, (Research Paper), Jun. 20, 2017, 23 Pgs., https://www.fastcompany.com/40429311/how-the-blockchain-could-usher-in-a-future-of-shared-mobility.

Perspective on Car Data Monetization, (Research Paper), Apr. 5, 2018, Retrieved Jun. 26, 2018, 7 Pgs., https://verhaert.com/perspective-car-data-monetization.

Bailey Reutzel. "How Blockchain Tech Could Move Self-Driving Cars Into the Fast Lane." (May 25, 2017). Retrieved online May 12, 2022. https://www.coindesk.com/markets/2017/05/25/how-blockchain-tech-could-move-self-driving-cars-into-the-fast-lane/ (Year: 2017).

Rodney Brooks. "Edge Cases For Self Driving Cars." (Jun. 17, 2017). Retrieved online May 12, 2022. https://rodneybrooks.com/edge-cases-for-self-driving-cars/ (Year: 2017).

Tenere.com. "Autonomous Vehicles Are Driving Investment in Fiber, Edge, and 5G." (Jun. 15, 2017). Retrieved online May 12, 2022. https://www.tenere.com/custom-autonomous-transportation-edge-infrastructure (Year: 2017).

Disruptor. Blockchain For Automotive: 12 Possible Use Cases. (Nov. 6, 2018). Retrieved online Jan. 11, 2023. https://www.disruptordaily.com/blockchain-use-cases-automotive/ (Year: 2018).

Gartner, "Forecast: Blockchain Business Value, Worldwide, 2017-2030", available online at <https://www.gartner.com/en/documents/3627117>, Mar. 2, 2017, 6 pages.

McKinsey & Company, "Monetizing car data New service business opportunities to create new customer benefits", Sep. 2016, 60 pages.

McKinsey & Company. "Driving impact at scale from automation and AI." (Feb. 2019). Retrieved online Sep. 1, 2023. https://www.mckinsey.com/~/media/Mckinsey/Business%20Functions/McKinsey%20Digital/Our%20Insights/Driving%20impact%20at%20scale%20from%20automation%20and%20AI/Driving-impact-at-scale-from-automation-and-AI.ashx (Year: 2019).

McKinseyS. Company. "The Internet of Things: How to capture the value of IoT." (May 2018). Retrieved online Sep. 1, 2023. https://www.mckinsey.com/~/media/McKinsey/Business%20Functions/McKinsey%20Digital/Our%20Insights/Driving%20impact%20at%20scale%20from%20automation%20and%20AI/Driving-impact-at-scale-from-automation-and-AI.ashx (Year: 2018).

(56) References Cited

OTHER PUBLICATIONS

Reference V (continued) https ://www.mcKinsey.com/~/media/McKinsey/Business%20Functions/McKinsey%20Digital/Our%20Insights/Driving%20impact%20at%20scale%20from%20automation%20and%20AI/Driving-impact-at-scale-from-automation-and-AI.ashx (Year: 2018).

Reference X (continued) https://www.mckinsey.com/~/media/McKinsey/Business%20Functions/McKinsey%20Digital/Our%20Insights/Driving%20impact%20at%20scale%20from%20automation%20and%20AI/Driving-impact-at-scale-from-automation-and-AI.ashx (Year: 2019).

* cited by examiner

REWARDS FOR CUSTOM DATA TRANSMISSIONS

CROSS-REFERENCE TO RELATED APPLICATIONS

This application is a continuation of U.S. patent application Ser. No. 16/131,578, filed Sep. 14, 2018, the contents of which are incorporated herein by reference in its entirety.

BACKGROUND

Data about an edge device may be transmitted to a computing device. The data about the edge device may be received by an entity from the computing device.

DETAILED DESCRIPTION

Figure 1:
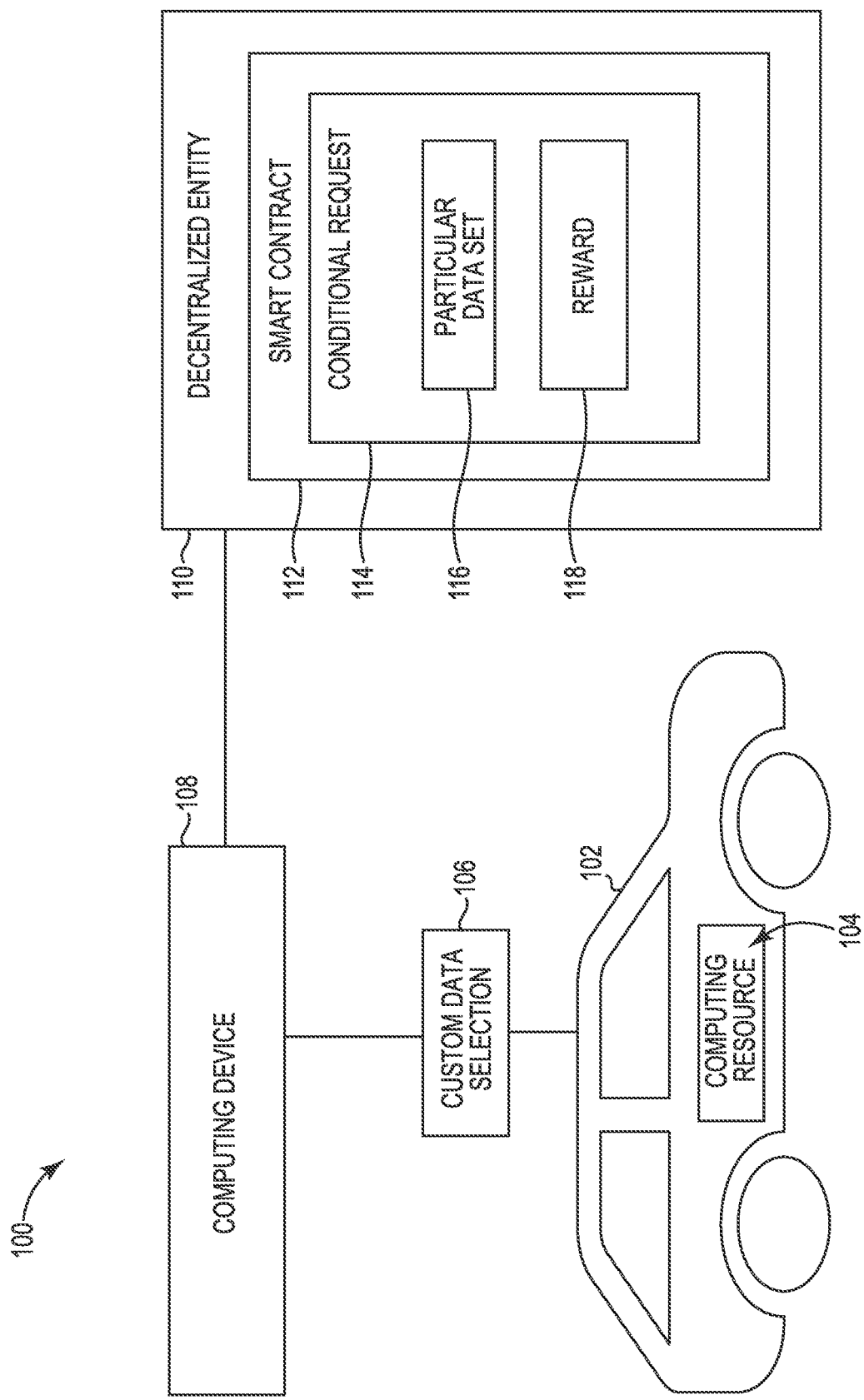
FIG. 1 illustrates an example system including a computing device for facilitating rewards for custom data transmissions consistent with the disclosure.

Edge devices may produce data about themselves or may collect data about their environments which may be received by entities. The entities may use the data from the edge devices to answer relevant questions, predict future outcomes, evaluate plans, etc. For example, an entity may be a business, a person, an organization, or an otherwise interested identifiable party which may be interested in acquiring a particular data set about a device.

As used herein, a "device" refers to an article that is adapted for a particular and/or multiple purpose. A device may include a computing system. A device may include one or more memory resources to store data and/or instructions corresponding with the computing system. An edge device may refer to any device that is located at the edge of a network as opposed to the core (e.g., campus and/or near data center) of the network. A computing system may include one or more processing resources to execute instruction such as instruction corresponding to an operating system (e.g., Linus, Unix, Windows, etc.) to provide common services for applications running on the computing system. Some examples, of devices that include computing systems are personal computers, laptops, tablets, phablets, smartphones, Internet-of-Things (IoT) enabled devices, etc., may be included on a virtualized architecture and/or a non-virtualized architecture. As used herein, "IoT enabled devices" include devices embedded with electronics, software, sensors, actuators, and/or network connectivity which enable such devices to connect to a network and/or exchange data. Examples of IoT enabled devices include vehicles, home appliances, smart home devices, monitoring devices, wearable devices, devices enabling intelligent shopping systems, manufacturing devices, among other cyber-physical systems.

Devices including computing systems may produce data, and data buyers may consider the produced data to be valuable. As used herein, the term "data buyer" refers to entities interested in collecting the data produced by the devices. For example, data buyers may include businesses, manufactures, regulatory agencies, third-parties, public health, public safety, etc. who may be interested in real-time data collection to make decisions, change business practices, analyze outcomes of prior decisions, etc. The data produced by the devices have created a dynamically evolving and fastly changing data driven landscape where the data produced by the devices may be valuable and treated as a commodity by device manufactures and other interested data buyers. For example, the data produced by devices may be bought and sold by manufactures and third parties interested data buyers when data is shared. In these examples, the parties benefiting from the data acquisition are the data buyers and the manufactures. Furthermore, an IoT enabled device may include multiple components (e.g., multiple electrical control units (ECUs) on a vehicle) and each ECU of the multiple ECUs may produce data inherently during operation.

For example, an IoT-enabled device such as a vehicle (e.g., a connected and/or autonomous vehicle that has a computing capability to communicate with an external server and/or a network) may have multiple functional aspects which may be producing data that may be valuable to multiple entities. Therefore, the control over where the produced data goes and a reward for the exchange of the data may be of value to the owner and/or user of the data. Furthermore, the data produced may increase in value if the interested party is able to request specific data, and the user and/or owner of the device is able to accommodate by customizing the data provided for a mutually agreed upon reward. Therefore, the customization of the data produced by the devices and the real-time data driven reward in exchange for the data may be an incentive for providing specific custom data to a data buyer.

As such, examples discussed herein provide examples, of devices, operators, owners, etc. benefitting from the data that is inherently produced by the use (or non-use) of the device in a controlled custom way. For example, in the context of automotive and aircraft industries, generation of custom data may be sought in various situations as described in the following examples. As used herein, the term "custom data" and/or "custom data selection" refers to a device selectively selecting a particular data set, multiple points of data, a data stream, etc. The custom data selection may be limited or unlimited. For example, a custom data selection may include particular periods of time, geographical locations, operations, etc. As used herein, the term "vehicle" refers to a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a scooter, a skateboard, a hoverboard, an upright personal vehicle (e.g., a Segway), and/or anything used for transporting people, services, and/or goods.

Some example data buyers may include provisions for a particular data set to be collected from vehicles in exchange for a reward. For example, the particular data set may include a request for data about an amount of rain falling on a vehicle, at a particular geographical location, at a particular time. In this instance, the vehicle may provide a custom data selection based on the particular data set requested to receive the reward. In other examples, the data buyers may be public welfare agencies to collect data related to public safety and the reward may be information that is helpful to the user/operator of the device (e.g. the vehicle). As, used herein, the term "reward" refers to an element of perceived value. Some examples of a reward may include information, vouchers, currency, cryptocurrency, coupons, gifts, a statement of gratitude, affirmation, or a conformation of receipt of the custom data selection, access to other offered services, etc.

In providing control to the user/owner/operator/device to create custom data in exchange for a reward, it is technically challenging to provide secure custom data selection in real-time and to generate and communicate multiple data points from multiple ECUs that may be requested of the IoT enabled devices, as described in the above examples.

In addressing these technical challenges, some examples as disclosed herein may utilize an on-board computing resource (e.g., a Controller Area Network (CAN bus)) to compile the custom data selection requested by a data buyer and securely communicate it with a computing device (e.g., a Mobile Edge Computing, MEC server). The MEC server (e.g., a node on a network such as a wireless network and/or an on-board computing device) may transmit the custom data selection from the CAN bus to the data buyer in exchange for a reward. In some examples, the MEC server may apply a hash function to the custom data selection and verify that the contents of the custom data selection has fulfilled the request from the data buyer. The data buyer may utilize a smart contract script (e.g., a command executed by a program) and/or other decentralized applications (DApps), to which they may include the particular data set requested, and the reward offered in exchange for the particular data set. The smart contracts may reside on a decentralized entity which may include a distributed ledger technology (DLT), (e.g., a blockchain with smart contract capabilities) such that the smart contract may be accessed by the computing device (e.g., the MEC server). Furthermore, the MEC server may store the exchange between the device providing the custom data selection and the reward offered by the data buyer as a transaction and store the transaction information as an immutable record on the decentralized entity (e.g., a DLT and/or a blockchain). The data buyers may create, modify, delete or otherwise update provisions (e.g., specifying a condition such as particular combinations of ECUs, dates, times, geographical areas, etc.) using at least one smart contract and/or DApp. In this way, the data provided may be custom, controlled, and provided by the device in exchange for a reward upon mutual agreement. Further, by leveraging the decentralized entity with smart contract capability, the immutable record of the transaction by a particular device and a particular data buyer can be digitally verified against such dynamically changing environments as they are created, modified, deleted or otherwise updated.

FIG. 1 illustrates an example system 100 including a computing device for facilitating rewards for custom data transmissions consistent with the disclosure. FIG. 1 includes an edge device such as a vehicle 102 which may include a computing resource 104 to generate a custom data selection 106 with a computing device 108. The computing device 108 may be communicatively coupled to a decentralized entity 110 which may include a smart contract 112. A smart contract may refer to a computer code running on top of a blockchain containing a set of rules under which the parties to that smart contract agree to interact with each other. If and when the pre-defined rules are met, the agreement is automatically enforced. In this context, the smart contract 112 may be created by a data buyer and provisioned with a conditional request 114 including a particular data set 116, and a reward 118 which may be offered in exchange for the custom data selection 106. When the conditional request 114 is met, the custom data selection 106 defined by the data buyer may be supplied to the computing device 108 and the reward 118 may be provided to the data owner (e.g., owner or operator of the vehicle 102).

The vehicle 102 may include virtualized architecture and/or non-virtualized architecture deployed in the computing resource 104. The vehicle 102 may be provisioned with a plurality of hardware computing resources. For example, the computing resource 104 may include memory resources (and/or possess the ability to perform memory-like functions) to store instructions. The memory resource(s) may be electronic, magnetic, optical, virtual, and/or other physical storage devices that store executable instructions; for example, volatile memory (e.g., RAM, DRAM, SRAM, EPROM, EEPROM, etc.) and/or non-volatile memory (e.g., an HDD, a storage volume, data storage, etc.). In addition, the computing resource 104 may include a processor (and/or possess the ability to execute processor-like functions). For example, the computing resource 104 may include a processor which may be a central processing unit (CPU), a semiconductor-based microprocessor, and/or other hardware devices suitable for retrieval and execution of instructions stored in a memory resource (e.g., in a non-transitory computer readable medium). The example processor may fetch, decode, and execute instructions. As an alternative, or in addition to, retrieving and executing instructions, the example processor may include at least one electronic circuit that may include electronic components for performing the functionality of executed instructions. In some examples, the computing resource 104 deployed on the vehicle 102 may be a Controller Area Network (CAN bus).

As used herein, the term "CAN bus" refers to a computing resource that allows microcontrollers and devices to communicate with each other in applications absent a host computer. For example, the vehicle 102 may include multiple ECUs which may be allowed to communicate with each other via the CAN bus (e.g., the computing resource 104). In other words, each of the multiple ECUs may communicate with each other absent dedicated connection in between. The CAN bus may include processors and memory devices which may allow it to receive transmitted messages and communicate with nodes (e.g., the computing device 108). Further, the CAN bus may provide data about the multiple ECUs (e.g., the custom data selection 106).

As used herein, the term "electronics control unit" and/or "(ECU)", refers to an embedded system that detects and/or controls operation(s) of an electronic and/or mechanical device. In some examples, an ECU may be a sensor that may detect an operation of an electronic and/or mechanical device. For example, ECU(s) may be included on a vehicle to detect, execute or otherwise control physical operations on a vehicle (e.g., powertrain control module, speed control unit, brake control module, battery management system, biometric data, etc.). The computing resource 104 (e.g., the CAN bus) may provide real-time data from a combination of ECUs which may be compiled into a custom data selection 106 and transmitted to the computing device 108 which may be connected to the vehicle 102 via the computing resource 104.

For example, the computing device 108 may receive the custom data selection 106 from the vehicle 102 in response to the vehicle 102 having met the conditional request 114 of a smart contract 112. As used herein, the term "computing device" refers to a device that is adapted to transmit and/or receive signaling, and to process information within such signaling across a network. For example, the computing device 108 may receive the custom data selection 106 and securely transmit it to the decentralized entity 110 with a deployed smart contract 112 (created by a data buyer). The computing device 108 may receive the reward 118 from the smart contract 112 deployed on the decentralized entity 110 and securely transmit the reward 118 to the vehicle 102. In other words, the computing device 108 may act as an intermediary between the vehicle 102 and the data buyer to facilitate the receipt and secure transmission of a custom data selection 106 to the data buyer (via the smart contract 112) and a reward 118 from the data buyer to the vehicle 102. In some examples, the computing device 108 may be a Mobile Edge Computing (MEC) server.

As used herein, the term "Mobile Edge Computing server" and/or "MEC server" refers to a computing device on a node on a network such as a decentralized entity (e.g., DLT and/or a blockchain) and may communicate with the computing resource 104. For example, the vehicle 102 may be moving between two locations, the computing device 108 (e.g., a MEC server) may maintain communication with the vehicle 102 as it is traveling between the two locations. The computing device 108 may apply a hash function to the custom data selection 106 to securely communicate the custom data selection 106 to the smart contract 112 deployed on the decentralized entity 110.

As used herein, the term "hash function" refers to a cryptographic series of numbers and characters to act as a digital fingerprint applied to a piece of information to secure the information, prevent error, and/or be stored with a transaction on the blockchain. For example, a first hash function may be applied by the computing device 108 to the custom data selection 106 such that the hash function may be stored as part of the transaction record on the decentralized entity 110. The custom data selection 106 may be transmitted from the vehicle 102 via the computing device 108 to the data buyer that created the smart contract 112 via a side channel. As used herein, the term "side channel" refers to a communication between the device (e.g., the vehicle 102) and the data buyer. For example, the vehicle 102 may transmit via a side channel, the custom data selection 106 to the data buyer (bypassing the decentralized entity). In some examples, the vehicle 102 may transmit the custom data selection 106 to the data buyer via a side channel and the computing device 108. Either way, in response to receiving the custom data selection 106 from the vehicle 102, the data buyer may execute a second hash function of the custom data selection 106 received and compare the result of the first hash function stored on the decentralized entity 110, and the second hash function executed by the data buyer. The result of this comparison is referred to as a hash value. A hash value result indicating the compared first and second hash functions are the same indicate that there has not been an error in transmission of the custom data selection 106 to the data buyer. In this way, hash functions may secure the customized data selection 106 from tampering, hacking, malicious intent, transmission error, etc. and the hash function may be securely stored with the transaction as a block in a blockchain.

In some examples, the vehicle 102 may compile a custom data selection 106 and the computing device 108 may authenticate the custom data selection 106. As used herein, the term "authenticate" refers to the computing device 108 confirming that the data included in the custom data selection 106 is valid (e.g., from the vehicle 102, contains the correct data, etc.). For example, the computing device 108 may apply a time stamp and/or other metadata to the custom data selection 106 and confirm the vehicle's 102 identity. In some examples, the computing device 108 may utilize a profile related to the vehicle 102 to transmit, receive, and/or otherwise authenticate the custom data selection 106.

For example, the vehicle 102 may include a profile which may be shared on the computing device 108. As used herein, the term "profile" refers to data which may be utilized to include information about a device (e.g., the vehicle 102). In some examples, the profile may be stored on the decentralized entity and include data about the transaction and the custom data selection 106. For example, the profile may include information about the vehicle 102, such as the make, model, year, color, user, owner, operator, vehicle identification number (VIN), etc. The computing device may provide a repository for the reward based on the profile and enable a user to view the conditional request 114, which includes the reward 118 and the particular data set 116, requested by a data buyer. A vehicle 102 may accept the smart contract 112 via the profile and create the custom data selection 106 to fulfill the smart contract 112 utilizing the profile. The vehicle 102 may receive the reward 118 and store the reward 118 in a repository utilizing the profile. As used herein, the term "accept" refers to a device agreeing to provide data per a request. For example, a vehicle 102 may accept a smart contract 112 via the computing resource 104, and/or the profile. The profile is further discussed herein in connection with FIG. 2.

As mentioned herein, the computing device 108 may transmit data from the vehicle 102 provisioned with hardware computing resources 104 to a decentralized entity 110. As used herein, the term "decentralized entity" refers to an open-source, public, distributed computing platform. The decentralized entity may include distributed ledger technology (DLT). The DLT includes a consensus of replicated, shared, and synchronized digital data which may be spread across multiple computing devices. In some examples, the decentralized entity may be a blockchain-based distributed computing platform. For example, a block may include information and may be added to a blockchain as an immutable record, the blocks may be linked together utilizing the hash function applied to the information by the computing device 108. In some examples, the hash function of the custom data selection 106 may be stored with the transaction as an immutable record in a block in the blockchain in the decentralized entity 110. For example, the decentralized entity 110 may include smart contract 112 functionality such that a data buyer may create a smart contract 112 to include a conditional request 114, a particular data set 116, and/or a reward 118 to be offered in exchange for the custom data selection 106. The custom data selection 106 may fulfil the requested particular data set 116, and the transaction and the hash function of the custom data selection 106 may be stored on the blockchain. In another example, the complete custom data selection 106 may be stored on a profile corresponding to the vehicle 102 in the computing device 108.

As used herein, the term "smart contract" is a protocol to digitally facilitate, verify, and/or enforce a negotiation and/or a performance of information in credible transactions. A smart contract script (e.g., a command executed by a program) may be executed by the computing device 108. The smart contract 112 may be generated by a data buyer (e.g., a manufacturer, business, public safety organizations, and/or a legal entity etc.). The data buyer may create the smart contract 112 by stipulating the parameters to fulfill the conditional request 114 and funding the smart contract 112 with the reward 118. In some use cases (such as mass casualty events), it is possible that no reward 118 is funded by the data buyer (e.g., Red Cross organization) that uses the particular data set 116 for public benefits. Therefore, the reward 118 may be an optional component in the conditional request 114. Data buyers may create, modify, delete or otherwise update provisions (e.g., specifying a conditional request 114, requested particular data set 116, and the reward 118 offered in exchange for the fulfillment of the smart contract 112) using a smart contract 112. Therefore, by leveraging the smart contract 112 capability, and the immutable record capability of the decentralized entity 110 the custom data selection 106 created by the vehicle 102 may be digitally verified against such dynamically changing requests from the data buyer as they are created, modified, deleted or otherwise updated and the vehicle 102 may collect the reward 118. As mentioned herein, the data buyer may provide a smart contract 112 provisioned with a conditional request 114.

For example, a data buyer may create a smart contract 112 to include a conditional request 114. As used herein, the term "conditional request" refers to parameters that when met fulfill the conditional request 114 to release the reward 118. The conditional request 114 may be created by the data buyer and provided to the vehicle 102 by the computing device 108. For example, a conditional request 114 may include a reward 118 offered in exchange for a particular data set 116, and other parameters such as a particular time, day, distance, geographical region, etc. which may correspond to the particular data set 116 for the smart contract 112 to be fulfilled. As used herein, the term "fulfilled" refers to a custom data selection 106 provided to include the particular data set 116 of the conditional request 114 of the smart contract 112. For example, a particular data set 114 may be rainfall data on a two Kilometer (Km) stretch of road after the sun has gone down. In this example, the vehicle 102 may fulfill the conditional request 114 and receive the reward 118 when the vehicle creates the custom data selection 106 to include the particular data set 116. In other words, the custom data selection 106 may include a combination of data from one ECU or multiple ECU(s) which may be created by the vehicle 102 based on the particular data set 116 requested in the conditional request 114 of the smart contract 112. In some examples, since the computing device 108 is communicatively connected to both the vehicle 102 and the decentralized entity 110, the vehicle 102 may monitor the computing device 108 for available smart contracts 112.

As used herein, the term "monitor" refers to a device observing a computing device for smart contracts. For example, the vehicle 102, via the computing resource 104 and/or the profile, may monitor the computing device 108 for smart contracts 112 included on the decentralized entity 110. As used herein, the term "available" refers to a smart contract 112 that the vehicle 102 is capable of fulfilling. For example, the computing resource 104 of the vehicle 102 may, via the profile, determine that the vehicle 102 is capable of fulfilling a smart contract 112. The computing resource 104 of the vehicle 102 may, via the profile, select the available smart contract 112 and agree to provide the particular data set 116 in exchange for the reward 118. The vehicle 102 may create a custom data selection 106 based on the requested particular data set 116. The computing device 108 may receive the custom data selection 106 from the vehicle 102 in response to the conditional request for the particular data set 116 requested by the smart contract 112 on the decentralized entity 110. In other words, the custom data selection 106 is data that has been selected by the vehicle 102 in response to an agreement to provide the custom data selection 106 responsive to a request by a data buyer for the particular data set 116. The computing device 108 may authenticate the custom data selection 106.

For example, the computing device 108 may authenticate the custom data selection 106 by applying metadata (e.g., a time stamp) indicating a time the custom data selection 106 was created and/or details about the vehicle 102 that created the custom data selection 106. The authenticated custom data selection 106 may be used to verify that the custom data selection 106 fulfills the conditional request 114 of the smart contract 112 included on the decentralized entity 110. For example, the custom data selection 106 may be transmitted by the computing device 108 to the decentralized entity 110 to be verified by the smart contract 112. The smart contract 112 may compare the authenticated custom data selection 106 to the conditional request 114 to determine if the particular data set 116 requested was met by the custom data selection 106. The computing device 108 may apply a hash function to the custom data selection 106. The hash function of the custom data selection 106 may be stored with the transaction as an immutable record on the blockchain of the decentralized entity 110. The vehicle 102 may transmit, via the computing device 108 the custom data selection to the data buyer via a side channel. If the data buyer determines via the hash value and the smart contract 112 that the conditional request 114 has been fulfilled, the decentralized entity 110 may transmit, via the smart contract 112, the reward 118, to the computing device 108. The computing device 108 may transmit the reward 118 to the vehicle 102 from the decentralized entity 110 in response to the custom data selection 106 having fulfilled the conditional request 114. The vehicle 102 may receive the reward 118 in the profile, in this way, the data buyer may receive specific custom data which may be more valuable than wholesaled non-specific data, and the user/operator may directly benefit by receiving a reward 118 in exchange for the specific custom data selection 106. In some examples, the requested particular data set 116 may include multiple combinations of ECU information thus the custom data selection 106 may be created by the vehicle 102 specifically for the smart contract 112.

For example, the conditional request 114 for the particular data set 116 may include conditions related to a global positioning system (GPS) fence and the particular data set 116 requested may include data from an ECU measuring the shocks and the speed of the vehicle 102 when the vehicle 102 is within the GPS fence. In this example, vehicle may create the custom data selection 106 by agreeing to share the ECU information about the shocks and the speed of the vehicle 102 during the time period when the vehicle is within the GPS fence. In some examples, the custom data selection 106 may be a stream of data from an ECU of the vehicle 102 over a period of time.

As used herein, the term "stream" refers to a data that can be continuously collected for a period of time. For example, the conditional request 114 for the particular data set 116 includes conditions related to a time period and the particular data set 116 requested includes data related to diagnostic services for an electronics control unit (ECU) of the vehicle 102. In this example, the vehicle 102 may monitor the computing device 108 for an available smart contract 112. The vehicle 102 may determine that a smart contract 112 is offering a reward 118 in the form of a discount on an oil change for the vehicle 102 in exchange for the conditional request 114 of supplying a data stream of brake pad usage for a period of time. For example, the vehicle 102 may create a custom data selection 106 to include the ECU (e.g., the brake pad) data stream relating to the diagnostic service (brake pad usage) for a specific time period (e.g., one hour). Thus, the data buyer gets specific potentially useful information and the vehicle 102 directly benefits by receiving the reward 118 for the discounted oil change.

In another example, the conditional request 114 for the particular data set 116 includes conditions related to a geographical location and the particular data set 116 requested includes data related to biometric sensors included in the vehicle 102. In this instance, assume the geographical location is a 100 Km radius of a particular location and the biometric sensors are related to a measurement of sleepiness of an operator of the vehicle 102, and the reward 118 is a discounted rate for lodging. The vehicle 102 may accept the smart contract 112 and provide the custom data selection 106 when biometric ECUs of the vehicle 102 detect sleepiness of the operator of the vehicle 102. Thus, the data buyer may receive a specific particular data set 116 from the vehicle 102 within the specific 100 Km radius, and the vehicle 102 may directly benefit by receiving the reward 118 for the discounted rate for lodging. In other examples, a data buyer may be interested in biometric data to gauge the number of individuals in a vehicle 102 and offer a reward 118 of information about parking. In another example, the vehicle 102 may be stationary, and the biometric data may be used in the custom data selection 106 to determine the temperature of humans or animals inside the vehicle 102 and the reward 118 may be an alert when the temperature reaches a particular level.

In another example, the conditional request 114 for the particular data set 116 requested by the smart contract 112 included on the decentralized entity 110 is related to telematics corresponding to a particular geographical area. In this instance assume that the conditional request 114 is a particular geographical area of 1,000 Km. Further assume the particular data set 116 requested is the number of transmission between a radio in the vehicle 102 with a dispatch unit within the 1,000 Km area, and the particular data set 116 requested is the transmission of a combination of ECUs of the vehicle 102 to the dispatch. In some examples, the reward 118 may be information related to public service, public health, safety, road conditions, etc.

For example, sometimes environmental conditions may affect the safety of device operation and a data buyer may be a non-profit (e.g., a public service entity) requesting specific information in the interest of public safety. In this instance, the conditional request 114 for the particular data set 116 may include conditions related to a geographical location (and/or a time period) and the particular data set 116 requested may include data related to environmental conditions. Specifically, the data buyer may be a public safety entity, the geographical location may be a GPS location, and the particular data set 116 may be snowfall at the GPS location during a period of time. The vehicle 102 may accept the smart contract 112 and provide a custom data selection 106 compiled from ECU data from the computing resource 104. In some examples, the reward 118 is one of information relating to the environment where the vehicle is located, a warning, an advisory, or combinations thereof. For example, the reward 118 may include data relating to nearby shelter locations or other public service announcements relating to public safety. Specifically, in this instance the data buyer may benefit from real-time, custom data that may be uniquely relevant to the data buyer at a time when it is requested and the vehicle 102 may directly benefit from a relevant reward 118. In some instances, the custom data selection 106 may be meaningful to a data buyer when multiple data from ECUs are included.

For example, the conditional request 114 for the particular data set 116 may include conditions related to a geographical location, a particular type (e.g., make, model, identification) of device, and/or a particular period of time, and the particular data set 116 requested may include data related to an operation of multiple ECUs of a vehicle 102, while the vehicle 102 is within the geographical location. Specifically, in this instance assume that a smart contract 112 includes the conditional request 114 of the data buyer is a particular data set 116 which includes data from ECUs measuring the power train, the brakes, the windshield wipers, and the fuel gauge, for a three hour period, within a 100 Km radius and the reward 118 is a discount on fuel within the 100 Km radius. The vehicle 102 may accept the smart contract 112 and create a custom data selection 106 including data collected for a three hour period within a 100 Km radius from the ECUs of the power train, the brakes, the windshield wipers, and the fuel gauge, and in exchange for the custom data selection 106 the vehicle may receive a reward 118 of discounted fuel from a fuel provider within the 100 Km radius. In this way, a data buyer may receive the custom data selection 106 which is relevant to the geographical location and the vehicle may be incentivized to provide the custom data selection 106 by receiving the reward 118 for a discount from a nearby fuel provider. In some examples, a device may preemptively accept a smart contract 112 prior to the availability of the custom data selection 106 to fulfil the conditional request 114.

For example, a smart contract 112 may include a conditional request 114 for a particular data set 116 including conditions related to a geographical location and the particular data set 116 requested may include data related to a performance of ECUs of the vehicle 102, while the vehicle 102 is within the geographical location. In this instance, assume that the performance may be a particular level of fuel or oil in the fuel tank and oil tank of the vehicle 102 within a 100 Km geographical radius and the reward 118 is a discount on fuel and/or maintenance for the vehicle 102. The smart contract 112 in this instance may be preemptively accepted and when the fuel level and/or oil level reaches the particular level of the conditional request 114 of the smart contract 112, the vehicle 102 may create the custom data selection 106 including the particular data set 116 requested. In exchange for fulfilling the smart contract 112 the reward may be issued to the vehicle 102. In this way, a data buyer may receive the custom data selection 106 which is relevant to the geographical location and the vehicle 102 may be incentivized to provide the custom data selection 106 by receiving the reward 118 for a discount from a nearby provider.

The examples described in connection with FIG. 1 describe rewards for custom data transmissions. A data buyer may fund a smart contract 112 with a reward 118 and request a particular data set 116 via the smart contract 112 deployed on a decentralized entity 110. A computing device 108, such as a MEC server may exist on nodes and be communicatively coupled to the decentralized entity 110 and a computing resource 104 (e.g., a CAN bus) on a vehicle 102. The computing device 108 may act to facilitate the reward 118 being transmitted to the vehicle 102 in exchange for the custom data selection 106. In this way, the data buyer may receive a specific custom data selection 106 which may be more valuable than wholesaled non-specific data, and the user/operator and/or the vehicle 102 may directly benefit by receiving a reward 118 in exchange for the specific custom data selection 106.

Figure 2:
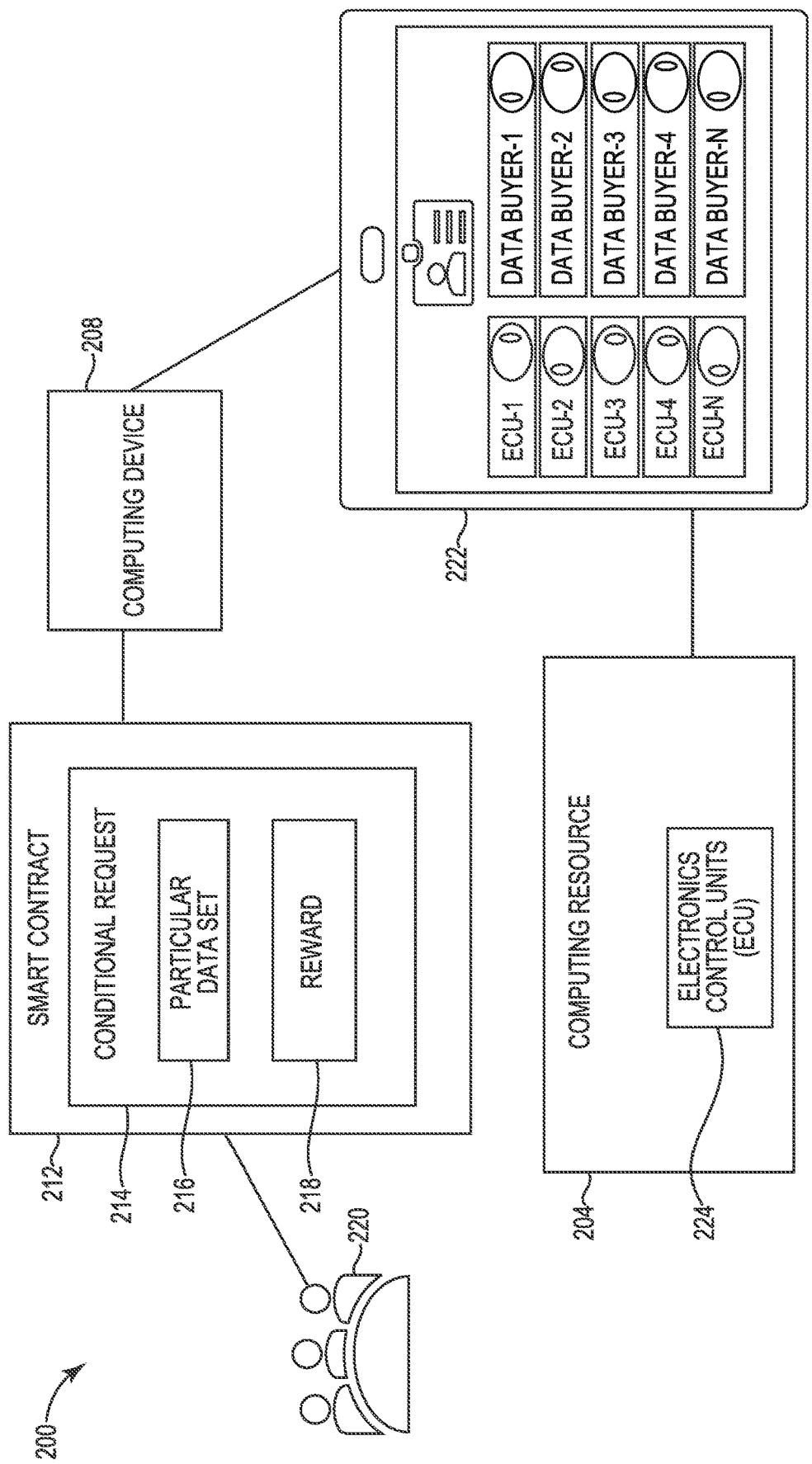
FIG. 2 illustrates an example system including a computing device for facilitating rewards for custom data transmissions consistent with the disclosure.

FIG. 2 illustrates an example system 200 including a computing device 208 for facilitating rewards for custom data transmissions consistent with the disclosure. FIG. 2 includes a data buyer 220 to provide a smart contract 212 with a conditional request 214 including a particular data set 216 and a reward 218. Although not shown in FIG. 2 so as to not obscure the examples of the disclosure, the smart contract 212 may be deployed on a decentralized entity such as the decentralized entity 110 of FIG. 1 (e.g., a blockchain with smart contract capabilities). FIG. 2 illustrates a computing device 208, a profile 222, a computing resource 204, and ECUs 224. Although not illustrated in FIG. 2 as to not obscure examples of the disclosure, the computing resource 204 may be included in an edge device (e.g., the vehicle 102 of FIG. 1). In some examples the computing resource 204 may deploy the profile 222 on the computing device 208.

For example, the profile 222 may include information about the user/operator and/or the device (the vehicle 201) to which the computing resource 204 is deployed. The computing device 208 monitors the vehicle based on the profile 222 for available smart contracts 212 that may be accepted by the computing resource 204 via the profile 222. For example, a smart contract 212 may be funded with a reward 218 by the data buyer 220 in exchange for a custom data selection (e.g., the custom data selection 106) corresponding to the requested particular data set 216. The computing resource 204 may determine, via the profile 222 of the device (e.g., a vehicle) presented on a mobile device (e.g., a smart phone and/or a display included in the vehicle), that the conditional request 214 from the decentralized entity (e.g., via the smart contract 212) is a conditional request 214 from a data buyer 220. In some examples, an edge device (e.g., a vehicle) including a computing device 204 may generate a counter offer.

As used herein, the term "counter offer" refers to an offer made by the device in response to the receipt of a smart contract. For example, the computing device 204 may generate a counter offer which may include a change or modification to the conditional request 214 of the smart contract 212 offered by the data buyer 220. The counter offer may include alterations to the conditional request 214. The data buyer 220 may receive the counter offer from the computing resource 204 and the data buyer 220 may create a new smart contract 214 including the modified conditional requests 214 of the counter offer.

In some examples, an edge device (e.g., the vehicle 102 of FIG. 1) includes the computing resource 204 which may include machine learning capabilities. The profile 222 may include specifications corresponding to the edge device and/or an operator such that the computing resource 204 may automatically negotiate the conditional request 214 of a smart contract 212, based on the profile 222. Specifically, the computing resource 204 may automatically generate a counter offer, based on the specifications included on the profile 222, and the data buyer 220 may accommodate the counter offer by generating a new smart contract 212. The profile 222 may be displayed with information about the data buyer 220 such that the device may decline or accept the smart contract 212 that was created by the data buyer 220.

For example, the profile 222 may be displayed as an application on a smart phone, a tablet, a computing device, the display of a vehicle, etc. such that an available smart contract 212 may be viewed and accepted by an edge device (e.g., a vehicle). In some examples, the profile 222 may be utilized to create the custom data selection.

For example, the profile 222 via the computing resource 204 may accept, decline, and/or refrain from accepting, an available smart contract 212. The conditional request 214 of the smart contract 212 may include a particular data set 216 requested to include multiple data from the ECUs 224. The profile 222 may include options to select and deselect which ECUs, data points, data packages, and/or multiple data points (and/or data streams) from multiple ECUs, may be made available to the smart contract 212 via the computing device 208 such that the computing resource 204 via the profile 222 may create a custom data selection corresponding to the requested particular data set 216. In other words, the profile 222 may provide for the edge device to create a specific combination of ECU data and data buyers 220 to create a custom data selection. Specifically, FIG. 2 illustrates the profile 222 having options to select/deselect options e.g., ECU-1, ECU-2, ECU-3, ECU-4, and ECU-N where each of these options may correspond to a different ECU 224, and include data points, data packages, and/or multiple data points (and/or data streams) from multiple ECUs. In this way, the edge device (e.g., the vehicle 102) may create which data is shared with the data buyer 220 via the smart contract 212. In some examples, the edge device (e.g., the vehicle 102) may select/deselect a specific data buyer 220, categories of data buyers 220, and/or groups of data buyers 220 to share data.

An example category of data buyer 220 may be public service entities, manufacturing entities, retail entities, etc. A group of data buyers 220 may be data buyers 220 within a geographical area, data buyers 220 of the same company (e.g., gas stations of a particular company), data buyers 220 of the same retail establishment within a geographical area, etc. The profile may be utilized to select/deselect specific data buyers 220, groups of data buyers 220, or categories of data buyers 220. For example, FIG. 2 illustrates the profile 222 having options to select/deselect options e.g., DATA BUYER-1, DATA BUYER-2, DATA BUYER-3, DATA BUYER-4, and DATA BUYER-N where each of these options may correspond to a different data buyer 220, categories of data buyers 220, and/or groups of data buyers 220. In other words, the profile 222 may be used to control where the data compiled in the custom data selection is transmitted by selecting to include and/or exclude data buyers 220. In some examples, the profile 222 may collect and/or store the reward 218.

The profile 222 may include a virtual repository to collect the reward 218 that may be funded to the smart contract 212 by the data buyer 220. The virtual repository may operate as a virtual wallet where an edge device (e.g., the vehicle 102) may store the reward 118. In this way, the edge device may use the reward 118 as they are collected or save them for a later time.

The examples described in connection with FIG. 2 describe a profile 222 which may be used to create a custom data selection in response to a request for a particular data set 216. In this way, the edge device (e.g., the vehicle 102) may control what data from the ECU may be shared and may directly benefit from the reward 218. Further, the data buyer 220 may benefit by receiving the custom data selection corresponding to the particular data set 216 per the smart contract 212. By utilizing the smart contract 212, the data buyer 220 may alter, change, delete, or otherwise amend the smart contract 212 to change the conditional request 214 and the particular data set 216 requested.

Figure 3:
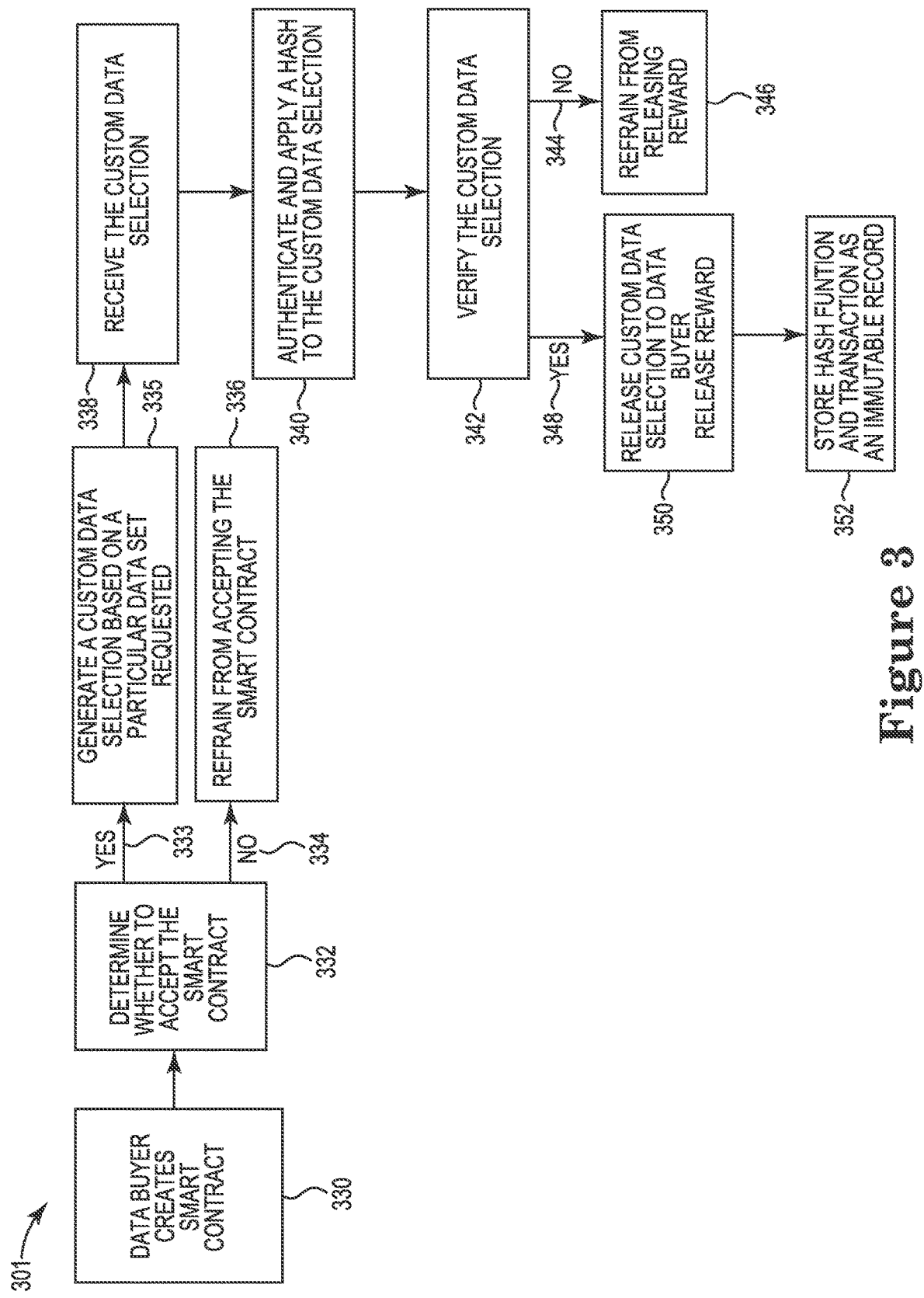
FIG. 3 illustrates an example flow chart for rewards for custom data transmissions consistent with the disclosure.

FIG. 3 illustrates an example flow chart 301 for rewards for custom data transmissions consistent with the disclosure. FIG. 3 illustrates a flow chart including many of the elements discussed herein in connection with FIGS. 1 and 2. However, the operations are not limited to a particular example described herein and may include additional operations such as those described with regard to the system 100 and 200 described in connection with FIGS. 1 and 2.

At block 330 a data buyer (e.g., the data buyer 220) may create a smart contract (e.g., the smart contract 112) including a conditional request (e.g., the conditional request 114) including a request for a particular data set (e.g., the particular data set 116), and the reward (e.g., the reward 118) offered to an edge device (e.g., the vehicle 102) in exchange for a custom data selection (e.g., the custom data selection 106) that fulfills the conditional request. For example, the data buyer may create the smart contract and publish it on a decentralized entity (e.g., the decentralized entity 110). The decentralized entity may be a blockchain with smart contract capabilities such that a smart contract may be stored once created by the data buyer. A smart contract may be changed by the data buyer when the data buyer creates a new smart contract. In this way, a smart contract may be created, modified, or otherwise updated. The smart contracts may be available to a computing device (e.g., the computing device 108) via a connection between the computing device and the decentralized entity.

For example, the computing device may be a MEC server which may exist on nodes. In this way, the computing device may be connected to a moving device (e.g., a vehicle) and the decentralized entity. An edge device such as a vehicle may include a computing resource (e.g., the computing resource 104) to monitor for available smart contracts. The computing device may monitor the computing resource based on the profile (e.g., the profile 222) for available smart contracts. For example, at block 332, the computing resource may via the profile, determine whether to accept the smart contract.

For example, the profile may display the smart contract and the information relating to the conditional request (e.g., the particular data set requested and the reward). When the vehicle (e.g., and/or an operator of a vehicle) declines the smart contract and the conditional request of the smart contract ("NO" at 334) the computing resource via the profile may refrain from accepting the smart contract at block 336. In another example, the computing resource may agree to accept the smart contract.

For example, the profile may display the smart contract and the information relating to the conditional request (e.g., the particular data set requested and the reward). When the vehicle (e.g., and/or an operator of a vehicle) accepts the smart contract and the conditional request of the smart contract ("YES" at 333) the computing resource via the profile may create a custom data selection based on the particular data set requested at block 335. For example, the computing resource may provide data from multiple ECUs and compile the data according to the conditional request of the smart contract. The computing resource of the vehicle may transmit the custom data selection to the computing device which may be connected to the computing resource and the decentralized entity.

For example, at block 338, the computing device may receive the custom data selection created by the vehicle in response to the conditional request of the smart contract. For example, the vehicle may transmit the custom data selection which corresponds to the particular data set requested by the smart contract. The custom data selection may be a specific selection of ECU data of the vehicle which may be valuable to the data buy who created the smart contract. In some examples, the computing device may authenticate the custom data selection.

For example, at block 340 the computing device may authenticate and apply a hash to the custom data selection. For example, the computing device may authenticate the custom data selection by providing a time stamp and/or other metadata to the custom data selection indicating when the selection was received, created, transmitted, details about the device that created the custom data selection etc. or combinations thereof. The computing device may apply a hash function to the custom data selection and the hash function may be stored with the transaction as an immutable record in the decentralized entity. The hash function applied to the custom data selection by the computing device may be compared to a hash function executed by the data buyer in response to the data buyer receiving the custom data selection from the vehicle via a side channel. The computing device may verify that the authenticated custom data selection fulfils the conditional request of the smart contract.

For example, at block 342, the smart contract may verify that the custom data selection corresponds to the particular data set requested and the conditional request (e.g., a particular GPS location, a particular time, etc.). For example, the custom data selection may be transmitted by the computing device to the decentralized entity to be verified by the smart contract. The smart contract may compare the authenticated custom data selection to the conditional request to determine if the particular data set requested was met by the custom data selection. In some examples, the custom data selection may not fulfill the smart contract, For example, if the smart contract determines that the custom data selection does not fulfil the smart contract by providing the conditional data request, ("NO" at 344), the smart contract may refrain from releasing the reward to the computing device at 346. The custom data selection may not fulfill the smart contract when the conditional request of the smart contract is not complete. This instance may occur when the ECUs included in the custom data selection are not correct, and/or other conditional factors (e.g., GPS, time period, make/model/type of vehicle) are not correct. In other examples, the custom data selection may fulfill the smart contract.

For example, if the smart contract determines that the custom data selection does fulfil the smart contract by providing the conditional data request, ("YES" at 348), the vehicle, via the computing device may release the custom data selection to the data buyer and the data buyer via the smart contract may release the reward to the vehicle via the computing device at block 350. Specifically, the smart contract may verify that the custom data selection corresponds to the particular data set and the conditional requests of the smart contract. This instance may occur when the ECUs included in the custom data selection not correct (the same as the particular data set requested), and/or other conditional factors (e.g., GPS, time period, make/model/ type of vehicle) are correct. In some examples, the computing device may store the hash function of the custom data selection as an immutable record in a blockchain.

For example, at block 352, the computing device may store the hash function of the custom data selection and the transaction as an immutable record in the decentralized entity. Specifically, the computing device may store the outcome and/or information about the vehicle as an immutable record with the transaction information in the blockchain. The custom data selection may also be stored in the profile corresponding to the vehicle on the computing device.

The examples described in connection with FIG. 3 describe rewards for custom data transmissions. A data buyer may fund a smart contract with a reward and request a particular data set via the smart contract deployed on a decentralized entity. A computing device, such as a MEC server may exist on nodes and be communicatively coupled to the decentralized entity and a computing resource (e.g., a CAN bus) on a vehicle. The computing device may act to facilitate the reward being transmitted to the vehicle in exchange for the custom data selection. In this way, the data buyer may receive a specific custom data selection which may be more valuable than wholesaled non-specific data, and the user/operator and/or the vehicle may directly benefit by receiving a reward in exchange for the specific custom data selection.

Figure 4:
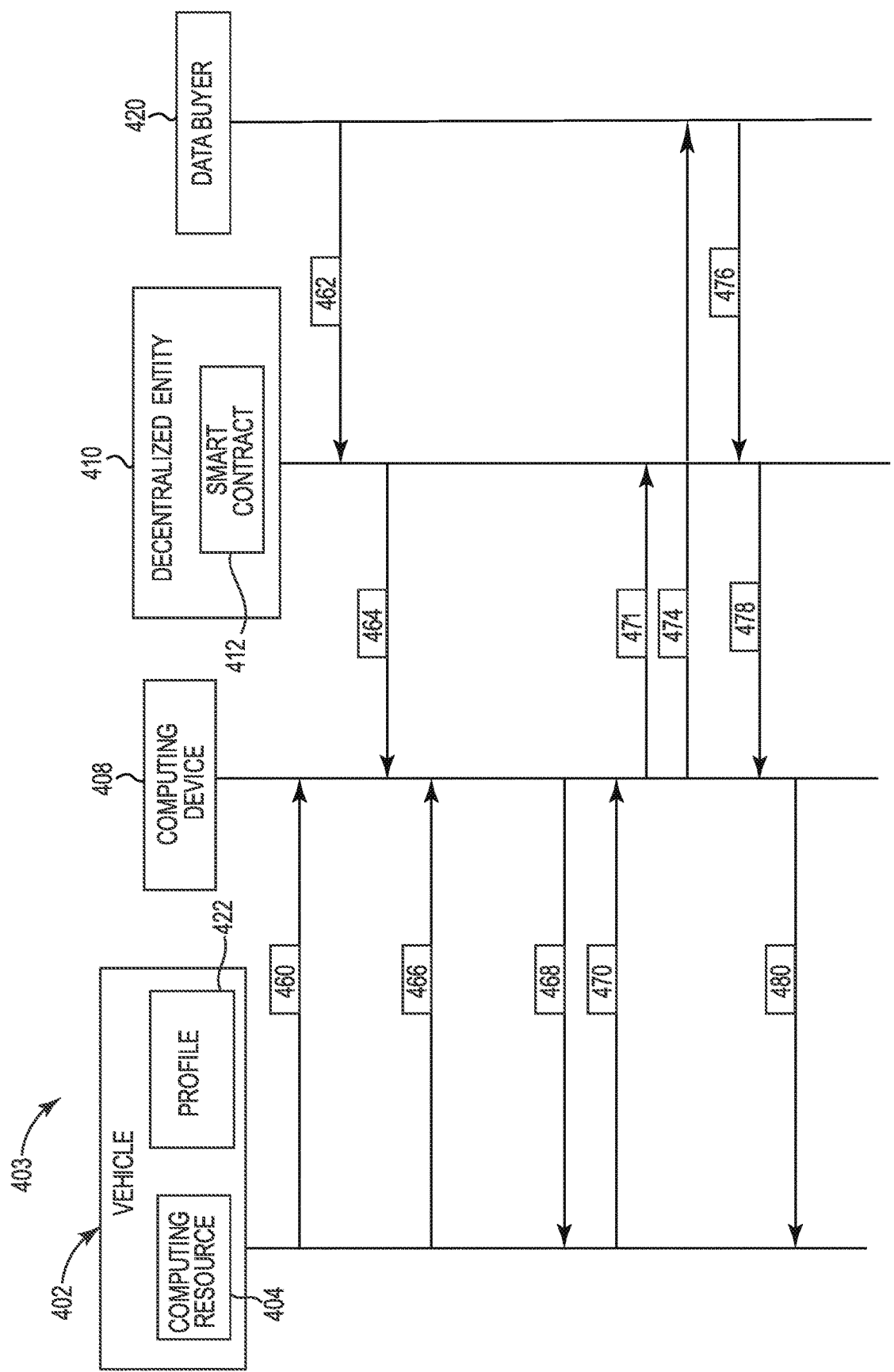
FIG. 4 illustrates an example flow diagram for rewards for custom data transmissions consistent with the disclosure.

FIG. 4 illustrates an example flow diagram 403 for rewards for custom data transmissions consistent with the disclosure. FIG. 4 illustrates a device such as a vehicle 402, a computing resource 404 (e.g., a CAN bus), a profile 422, a computing device 408 (e.g., a MEC server), a decentralized entity 410 (e.g., a blockchain) a smart contract 412, and a data buyer 420. The profile 422 may include information about the vehicle 402 such as the make, model, vehicle identification number, an owner, an operator, etc. The profile 422 may be displayed as an application on a mobile device (e.g., and/or other computing device such as a display within the vehicle) and functions relating to the creation of a custom data selection (e.g., the custom data selection 106) may be manipulated and controlled via the profile. In some examples, the profile may be shared with the computing device 408.

For example, at block 460 the vehicle 402 may share the profile 422 with the computing device 408 such that the computing device 408 may access information related to the profile 422. For example, the computing device 408 may determine if the vehicle 402 is monitoring for available smart contracts 412. Smart contracts 412 may be monitored on the computing device 408 when the smart contracts are deployed on the decentralized entity 410 by the data buyer 420.

For example, at 462 a data buyer 420 may create a smart contract 412 to include a conditional request (e.g., the conditional request 114) for a particular data set (e.g., the particular data set 116) and a reward (e.g., the reward 118) in exchange for a custom data selection (e.g., the custom data selection 106) from the vehicle 402. The smart contract 412 created by the data buyer 420 may be deployed on a decentralized entity 410 and available to the computing device 408.

For example, at 464 the computing device 408 may receive the smart contract 412 including the information included in the conditional request (e.g., the particular data set and the reward). In some examples, the vehicle 402 may use the profile 422 to monitor for smart contracts 412 that the vehicle 402 may have the capability to fulfill in exchange for the reward. For example, at block 466 the vehicle 402 may monitor the computing device for available smart contracts, based on the profile 422, and the vehicle may agree to the conditional request of the smart contract 412.

The computing device 408 may receive a notification that the vehicle 102 has agreed to the conditional request of the smart contract 112. In response to the agreement, at block 468, the computing device 408 may transmit conditional request of the smart contract 412 to the vehicle 402. For example, the computing resource 404 may receive the conditional request of the smart contract 412 and create the custom data selection to fulfill the particular data request of the smart contract 412.

For example, the vehicle 402 may create a custom data selection to fulfil the smart contract 412. In some examples, the profile 422 may be utilized to select and/or deselect a single ECU and/or multiple ECUs such that the data of the selected ECU(s) may be compiled into a custom data selection. Additionally, the profile 422 may be utilized to comply with other conditional requests (e.g., a particular time, or a particular location, etc.). In another example, the profile 422 may be utilized to preemptively agree to the smart contract 412 and instruct that the smart contract 412 may be executed when the data from the ECUs requested by the smart contract 412 becomes available. In yet another example, the profile 422 may be utilized by the computing device to collect data from ECU(s) for a period of time such that a stream of data may be created for the custom data selection. The vehicle 102 via the computing resource 404 may transmit the custom data selection to the computing device 408.

For example, at block 470, the vehicle 402 may transmit the custom data selection to the computing device 408. For example, the computing device 408 may receive the custom data selection 408 and authenticate the custom data selection. For example, the computing device may apply a time stamp to the custom data selection and apply a hash function to the custom data selection. The hash function may secure the custom data selection such that it may not be altered or tampered with. In this way, at block 471, the hash function may be stored with the transaction as an immutable record on the decentralized entity 410. The custom data selection may be verified by the computing device 408 and/or the smart contract 412. In other words, the computing device 408 may verify the custom data selection via the smart contract 412 on the decentralized entity 410. For example, the smart contract 412 may receive the custom data selection and compare the authenticated contents to the conditional request of the smart contract 412. In this way, the computing device 408 may determine if the custom data selection fulfils the smart contract 412. The vehicle 402, via the computing device 408 may transmit the custom data selection to the data buyer 420 via a side channel.

For example, at block 474, the vehicle 402 via the computing device 408 may transmit the custom data selection to the data buyer 420. The data buyer 420 may execute another hash function on the received custom data selection and compare it to the hash function stored as a record in the decentralized entity 410. The resulting hash value indicating that the hash functions are the same indicate to the data buyer 420 that the received custom data selection does not include an error (e.g., or other changes).

If the contents of the custom data selection fulfills the conditional request of the smart contract 412, the data buyer 420 may at block 476 execute the release of the reward via the smart contract 412. The smart contract 412 may transmit the reward to the computing device 408. In other words, at block 478, the smart contract 412 may transmit the reward to the computing device 408 in response to the custom data selection fulfilling the conditional request and the particular data set requested. In this way, the data buyer 420 may receive accurate, customized data in exchange for a reward of which the vehicle 402 may directly benefit.

For example, at block 478, the smart contract 412 may release/transmit the reward to the vehicle 402 via the computing device 408 in response to the custom data selection having fulfilled the conditional request of the smart contract 412. In response to receiving the reward, the computing device 408 may transmit the reward to the vehicle 402. For example, at block 480, the computing device 408 may transmit the reward to the vehicle 402. The profile 422 may include a virtual wallet associated with the vehicle 402, an owner, and/or an operator such that the reward may be stored and/or redeemed. The computing device 408 may store the transaction as a record in the decentralized entity 410.

The examples described in connection with FIG. 4 describe rewards for custom data transmissions. A data buyer 420 may fund a smart contract 412 with a reward and request a particular data set via the smart contract 412 deployed on a decentralized entity 410. A computing device 408, such as a MEC server may exist on nodes and be communicatively coupled to the decentralized entity 410 and a computing resource 402 (e.g., a CAN bus) on a vehicle. The computing device 408 may act to facilitate the reward being transmitted to the vehicle 402 in exchange for the custom data selection. In this way, the data buyer 420 may receive a specific custom data selection which may be more valuable than wholesaled non-specific data, and the user/operator and/or the vehicle 402 may directly benefit by receiving a reward in exchange for the specific custom data selection.

Figure 5:
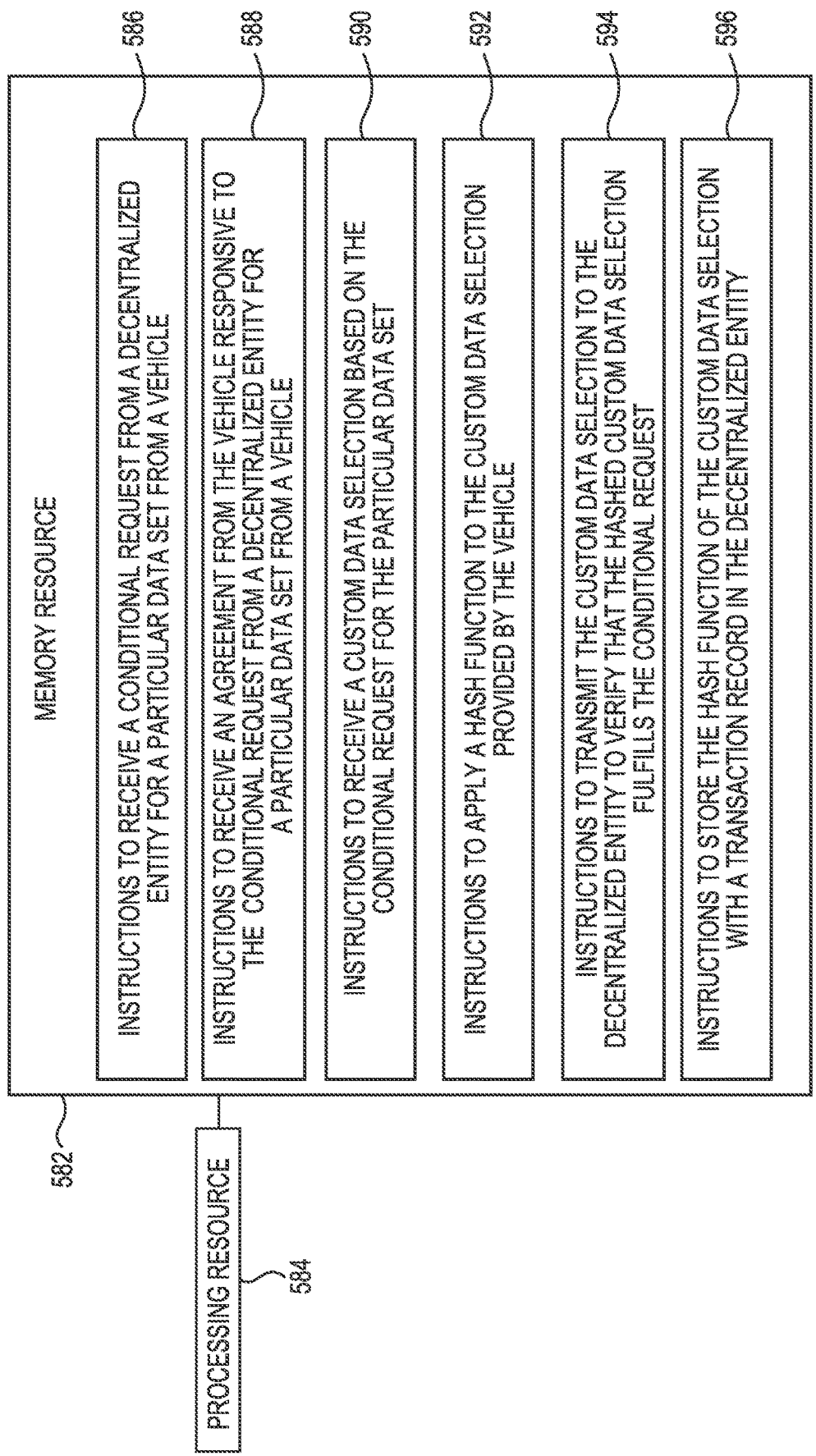
FIG. 5 illustrates an example of a non-transitory machine-readable memory resource and processing resource for rewards for custom data transmissions consistent with the disclosure.

FIG. 5 illustrates an example of a non-transitory machine-readable memory resource 582 and processing resource 584 for rewards for custom data transmissions consistent with the disclosure. Although not illustrated in FIG. 5 as to not obstruct the examples of the disclosure, the processing resource 584 and the memory resource 582 may be included in a computing device (e.g., the computing device 108). The processing resource 584 may be a hardware processing unit such as a microprocessor, microcontroller, application specific instruction set processor, coprocessor, network processor, or similar hardware circuitry that may cause machine-readable instructions to be executed. In some examples, the processing resource 584 may be a plurality of hardware processing units that may cause machine-readable instructions to be executed. The processing resource 584 may include central processing units (CPUs) among other types of processing units. The memory resource 582 may be any type of volatile or non-volatile memory or storage, such as random-access memory (RAM), flash memory, read-only memory (ROM), storage volumes, a hard disk, or a combination thereof.

The memory resource 582 may store instructions thereon, such as instructions 586, 588, 590, 592, 594, and 596. When executed by the processing resource 584, the instructions may cause the computing device to perform specific tasks and/or functions. For example, the memory resource 582 may store instructions 586 which may be executed by the processing resource 584 to cause the computing device to receive a conditional request (e.g., the conditional request 114) from a decentralized entity (e.g., the decentralized entity 110) for a particular data set (e.g., the particular data set 116) from a vehicle (e.g. the vehicle 102). For example, a smart contract (e.g., the smart contract 112) may be created by a data buyer (e.g., the data buyer 220) indicating a conditional request for a custom data selection (e.g. the custom data selection 106) that corresponds to the particular data set which may be exchanged for a reward (e.g., the reward 118). The smart contract may be funded by the data buyer and deployed on the decentralized entity. The computing device may be communicatively connected to both the vehicle and the decentralized entity to facilitate the exchange of a custom data selection for a reward.

For example, the memory resource 582 may store instructions 588 which may be executed by the processing resource 584 to cause the computing device to receive an agreement from the vehicle responsive to the conditional request from the decentralized entity for the particular data set. For example, the vehicle may include a profile (e.g., the profile 222) which may be shared with the computing device to monitor the computing device for available smart contracts. The computing resource of the vehicle may transmit an agreement from the vehicle to the computing device when the vehicle agrees to the conditional request of the smart contract where the conditional request and the smart contract may be available as data on the profile. The vehicle includes a computing resource (e.g., the computing resource 104) which may be a CAN bus. The computing resource may prepare a custom data selection from a single or multiple ECUs of the vehicle. The custom data selection corresponds to the particular data selection and the profile may be used to select and deselect the ECUs requested in the particular data set such that the custom data selection may be created and transmitted to the computing device.

For example, the memory resource 582 may store instructions 590 which may be executed by the processing resource 584 to receive a custom data selection based on the conditional request for the particular data set. In other words, the computing device may receive the created custom data selection from the vehicle. The computing device may authenticate the custom data selection by adding a time stamp and applying a hash function to the custom data selection such that it may be stored with the transaction as an immutable record.

For example, the memory resource 582 may store instructions 592 which may be executed by the processing resource 584 to apply a hash function to the custom data selection provided by the vehicle. The hash function may be used to secure the custom data selection and may be stored as part of an immutable record in the decentralized entity. The computing device may verify that the custom data selection fulfils the conditional request of the smart contract.

For example, the memory resource 582 may store instructions 594 which may be executed by the processing resource 584 to transmit the custom data selection to the decentralized entity to verify that the custom data selection fulfills the conditional request. In other words, the computing device may transmit the custom data selection to the smart contract deployed on the decentralized entity. Specifically, the smart contract may receive the hashed custom data selection and compare the authenticated contents to the conditional request of the smart contract. The vehicle may, via the computing device, transmit the custom data selection to the data buyer using a side channel. The data buyer may execute a hash function on the received custom data selection to identify if there has been an error in transmission. The transaction between the vehicle and the data buyer may be stored by the computing device as an immutable record with the hash function executed by the computing device on the blockchain of the decentralized entity.

For example, the memory resource 582 may store instructions 596 which may be executed by the processing resource 584 to store the hash function of the custom data selection with a transaction record in the decentralized entity. For example, the hash function may be stored with the transaction as an immutable record. In other words, a hash function corresponding to the custom data selection may be stored as a block in the blockchain of the decentralized entity.

The examples described in connection with FIG. 5 describe rewards for custom data transmissions. A data buyer may fund a smart contract with a reward and request a particular data set via the smart contract deployed on a decentralized entity. A computing device, such as a MEC server may exist on nodes and be communicatively coupled to the decentralized entity and a computing resource (e.g., a CAN bus) on a vehicle. The computing device may act to facilitate the reward being transmitted to the vehicle in exchange for the custom data selection. In this way, the data buyer may receive a specific custom data selection which may be more valuable than wholesaled non-specific data, and the user/operator and/or the vehicle may directly benefit by receiving a reward in exchange for the specific custom data selection.

Figure 6:
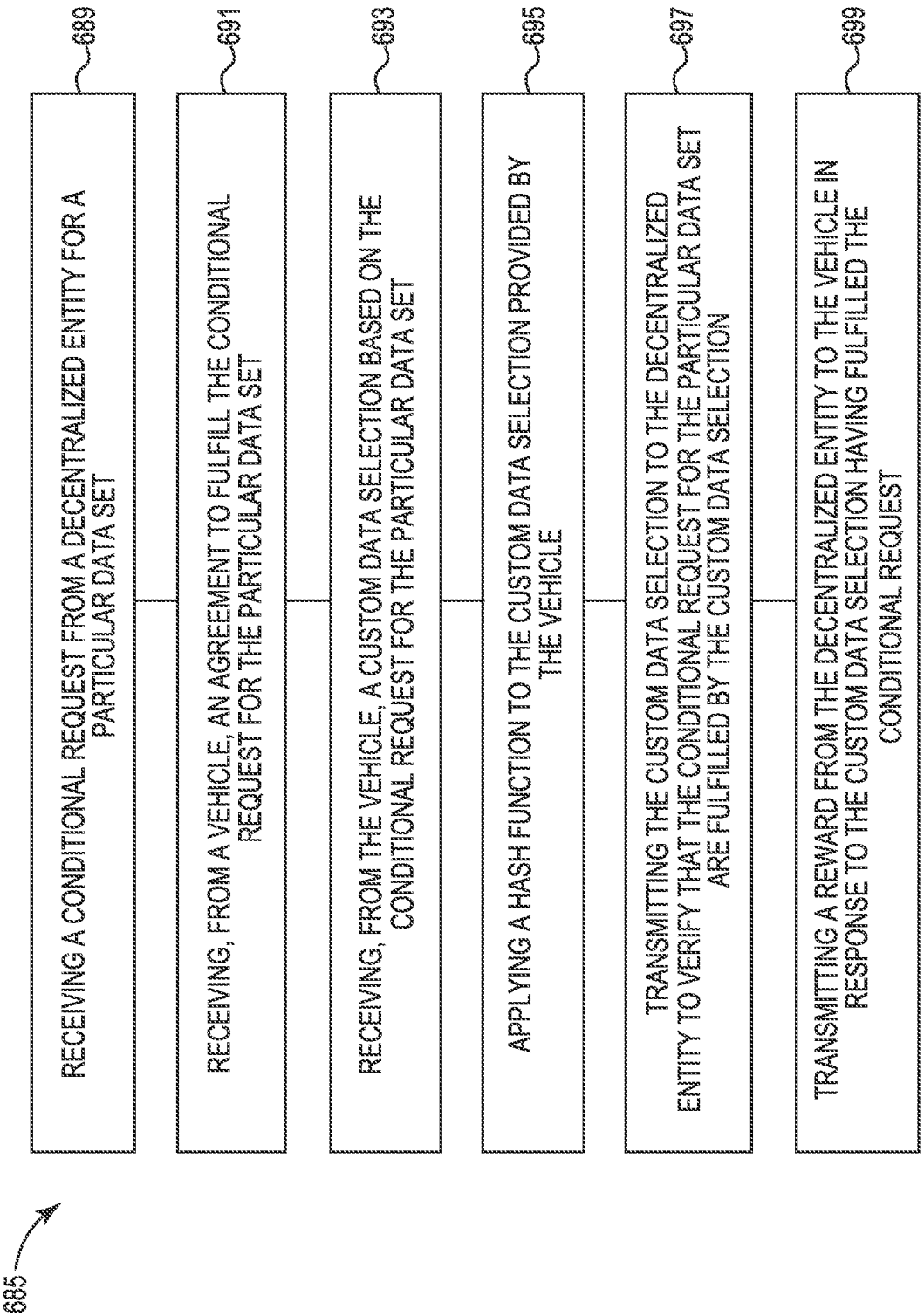
FIG. 6 illustrates an example method for rewards for custom data transmissions consistent with the disclosure.

FIG. 6 illustrates an example method 685 for rewards for custom data transmissions consistent with the disclosure. At 689, receiving, by a computing device (e.g., the computing device 108), a conditional request from a decentralized entity (e.g., the decentralized entity 110) for a particular data set (e.g., the particular data set 116), wherein the decentralized entity defines conditions for the particular data set. In other words, a smart contract (e.g., the smart contract 112) included on the decentralized entity may request the exchange of a custom data selection (e.g., the custom data selection 106) and the reward (e.g., the reward 118). In some examples, the smart contract may provide the conditional request to the computing device for a particular data set from a vehicle (e.g., the vehicle 102), wherein the conditional request includes information about the reward offered in exchange for the receipt of the custom data selection. The computing device may receive an agreement from the vehicle to provide the particular data set by creating a custom data selection.

For example, at block 691, receiving, by the computing device from a vehicle, an agreement to fulfill the conditional request for the particular data set. For example, the vehicle may include a profile (e.g., the profile 222) which may be shared with the computing device to monitor the computing device for available smart contracts. The computing device may determine via the profile of a vehicle displayed on a mobile device (e.g., a smart phone and/or a display in the vehicle), that the conditional request from the decentralized entity is a conditional request from a data buyer (e.g., the data buyer 220). The vehicle may determine whether to share the conditional requested data with the data buyer requesting it. In other words, a computing resource (e.g., the computing resource 104) of the vehicle may transmit an agreement from the vehicle to the computing device when the vehicle agrees to the conditional request of the smart contract. The vehicle includes the computing resource which may be a CAN bus to create the custom data selection.

For example, at block 693, receiving, by the computing device from the vehicle, a custom data selection based on the conditional request for the particular data set. The computing resource may prepare a custom data selection from a single or multiple ECU(s) of the vehicle. The custom data selection corresponds to the particular data selection and the profile may be used to select and deselect the ECUs requested in the particular data set such that the custom data selection may be created and transmitted to the computing device. The computing device may authenticate the custom data selection by applying a time stamp to indicate when the custom data selection was received and/or created and to secure the data for verification. The computing device may apply a hash function to the custom data selection provided by the vehicle.

For example, at block 695, applying by the computing device, a hash function to the custom data election provided by the vehicle. The hash function may be stored as an immutable record in the blockchain with the transaction record. The hash function may provide a way to verify that the custom data selection transmitted to the data buyer from the vehicle has not been tampered with or altered. Specifically, the vehicle may transmit the custom data selection via the computing device, to the data buyer utilizing a side channel. The data buyer may execute a new hash function and compare the new hash function to the hash function applied by the computing device. If the hash functions are the same (e.g., a hash value), the custom data selection received from the vehicle has not been altered. Thus, it is the same custom data selection that has been authenticated. The computing device may verify the contents of the custom data selection to the smart contract.

For example, at block 697, transmitting, by the computing device, the custom data selection to the decentralized entity to verify that the conditional request for the particular data set are fulfilled by the custom data selection. In other words, the computing device may transmit the custom data selection to the smart contract deployed on the decentralized entity. Specifically, the smart contract may receive the custom data selection and compare the authenticated contents to the conditional request of the smart contract. The computing device may transmit th
e reward to the vehicle when the conditional requests are met.

In some examples, at block 699, transmitting, by the computing device, a reward from the decentralized entity to the vehicle in response to the custom data selection having fulfilled the conditional request. For example, if the contents of the custom data selection fulfill the conditional request of the smart contract, the smart contract may transmit the reward to the computing device. Specifically, the particular data set requested by the decentralized entity may be related to biometric sensor data collected while the vehicle is in a geographical area, and the reward provided to the vehicle may be information about entities existing within the geographical area. The transaction between the vehicle and the data buyer may be stored by the computing device as an immutable record on the blockchain of the decentralized entity.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

What is claimed:

1. A system comprising:
a first edge computing device; and
a second edge computing device operatively connected to the first edge computing device, the first edge computing device configured to:
monitor the second edge computing device for available smart contracts;
determine to accept a given available smart contract of the available smart contracts based on a profile associated with the first edge computing device;
analyze the profile to determine one or more characteristics of or associated with the first edge computing device, and selectively choose a particular set of data captured at the first edge computing device corresponding to the one or more characteristics of the profile; and
compile a custom data selection based on the selectively chosen particular set of data.

2. The system of claim 1, wherein the custom data selection comprises data from one or more electronic control units (ECUs) of the first edge computing device.

3. The system of claim 1, wherein the given available smart contract comprises, at least in part, a conditional request specifying one or more parameters corresponding to the particular set of data.

4. The system of claim 3, wherein the conditional request comprises conditions associated with at least one of geographical location, a time period, and a type of the first edge computing device.

5. The system of claim 3, wherein monitoring the second edge computing device for available smart contracts comprises the first edge computing device analyzing the available smart contracts, including the one or more parameters, to determine whether the first edge computing device is able to fulfill the conditional request.

6. The system of claim 5, wherein the first edge computing device analyzes a collection of one or more sensors of the first edge computing device to determine whether the first edge computing device is able to fulfill the conditional request, the one or more sensors providing the data comprising the particular set of data.

7. The system of claim 1, wherein the first edge computing device compiles the custom data selection in real-time.

8. The system of claim 1, wherein the first edge computing device is further configured to:
in response to monitoring the second edge computing device for the available smart contracts, transmit a counter offer based on one or more modifications to a conditional request included in an available smart contract of the available smart contracts.

9. The system of claim 8, wherein the transmission of the counter offer is performed by the first edge computing device automatically based on the analysis of the profile.

10. The system of claim 1, wherein the second edge computing device authenticates the custom data selection by comparing data included in the custom data selection with one or more parameters of a conditional request of the given available smart contract.

11. A non-transitory memory resource including instructions executable by a first edge computing device to:
receive an agreement from a second edge computing device communicatively coupled to the first edge computing device to a conditional request for the second edge computing device to provide a custom data selection, wherein the conditional request is part of a smart contract to request an exchange of the custom data selection in exchange for a reward;
receive the custom data selection, wherein the custom data selection being generated by the second edge computing device upon a determination by the second edge computing device that one or more characteristics of the second edge computing device match parameters of the smart contract;
transmit the custom data selection to a decentralized entity for verification; and
upon verification, store a transaction record regarding an exchange of the custom data selection and a reward involving the second edge computing device.

12. The non-transitory memory resource of claim 11, further including instructions executable by the first edge computing device to forward the transaction record for storage on the decentralized entity as an immutable record.

13. The non-transitory memory resource of claim 11, further including instructions executable by the first edge computing device to authenticate validity of the custom data selection by applying metadata to the custom data selection and confirm an identify of the second edge computing device via a profile stored on at least one of the decentralized entity or the first edge computing device.

14. The non-transitory memory resource of claim 13, wherein the one or more characteristics of the second edge computing device are stored as at least a portion of the profile.

15. The non-transitory memory resource of claim 11, further including instructions executable by the first edge computing device to:
apply a hash function to the custom data selection; and
store the hash function of the custom data selection with the transaction record in the decentralized entity.

16. The non-transitory memory resource of claim 11, further including instructions executable by the first edge computing device to execute a smart contract script representative of the smart contract to digitally verify the custom data selection with the conditional request.

17. The non-transitory memory resource of claim 11, wherein the conditional requests comprise dynamically changing conditional requests.

18. The non-transitory memory resource of claim 11, further including instructions executable by the first edge computing device to maintain communication with the second edge computing device as the second edge computing device travels between two or more locations.

19. The non-transitory memory resource of claim 11, wherein the first edge computing device comprises a mobile edge computing server, wherein the second edge computing device comprises a vehicle, and wherein the decentralized entity comprises a blockchain-based distributed computing platform including distributed ledger technology.

20. The non-transitory memory resource of claim 11, wherein the custom data selection is generated in real-time or in accordance with a time period specified as part of the conditional request.

* * * * *